United States Patent
Ellul et al.

(10) Patent No.: US 6,503,985 B1
(45) Date of Patent: Jan. 7, 2003

(54) THERMOPLASTIC ELASTOMERS HAVING IMPROVED SET AND FOAMS MADE THEREFROM

(75) Inventors: Maria D. Ellul, Silver Lake Village, OH (US); Abdelhadi Sahnoune, Akron, OH (US)

(73) Assignee: Advanced Elastomer Systems, L.P., Akron, OH (US)

( * ) Notice: Subject to any disclaimer, the term of this patent is extended or adjusted under 35 U.S.C. 154(b) by 0 days.

(21) Appl. No.: 10/171,177

(22) Filed: Jun. 12, 2002

Related U.S. Application Data

(62) Division of application No. 09/771,044, filed on Jan. 26, 2001, now Pat. No. 6,433,090.

(51) Int. Cl.$^7$ .......................... C08L 23/00; C08L 23/04; C08L 25/02; C08L 27/12
(52) U.S. Cl. ....................... 525/191; 525/199; 525/232; 525/240; 525/241; 525/326.1; 525/326.7
(58) Field of Search ................................ 525/191, 199, 525/232, 240, 241, 326.1, 326.7

(56) References Cited

U.S. PATENT DOCUMENTS

| | | | |
|---|---|---|---|
| 2,972,600 A | 2/1961 | Braidwood | 528/129 |
| 3,287,440 A | 11/1966 | Giller et al. | 525/139 |
| 4,212,787 A | 7/1980 | Matsuda et al. | 525/211 |
| 4,311,628 A | 1/1982 | Abdou-Sabet et al. | |
| 4,916,198 A | 4/1990 | Scheve et al. | 526/351 |
| 5,070,111 A | 12/1991 | Dumbauld | 521/85 |
| 5,100,947 A | 3/1992 | Puydak et al. | 524/423 |
| 5,157,081 A | 10/1992 | Puydak et al. | 525/237 |
| 5,290,886 A | 3/1994 | Ellul | 524/515 |
| 5,397,832 A | 3/1995 | Ellul | 524/515 |
| 5,504,171 A | 4/1996 | Etherton et al. | 526/336 |
| 5,567,370 A | 10/1996 | Deseke et al. | 264/53 |
| 5,656,693 A | 8/1997 | Ellul et al. | 525/171 |
| 5,670,595 A | 9/1997 | Meka et al. | 526/336 |
| 5,786,403 A | 7/1998 | Okada et al. | 521/134 |
| 5,824,400 A | 10/1998 | Petrakis et al. | 428/218 |
| 5,889,119 A | 3/1999 | Coran et al. | 525/232 |
| 5,936,028 A | 8/1999 | Mesdker et al. | 524/506 |
| 6,143,828 A | 11/2000 | Chee et al. | 525/192 |
| 6,245,856 B1 | 6/2001 | Kaufman et al. | 525/240 |

FOREIGN PATENT DOCUMENTS

| | | |
|---|---|---|
| EP | 0 753 529 | 1/1997 |
| EP | 0 872 516 | 10/1998 |

OTHER PUBLICATIONS

"Novel Foamable Polypropylene Polymers," by Bradley et al., SPE Antec Tech. Papers, 36, 717–720, 1990.

*Primary Examiner*—Nathan M. Nutter
(74) *Attorney, Agent, or Firm*—Arthur M. Reginelli; William A. Skinner

(57) ABSTRACT

A thermoplastic vulcanizate prepared by a process comprising the steps of dynamically vulcanizing a vulcanizable rubber within a mixture that includes from about 15 to about 90 percent by weight of the rubber and from about 10 to about 85 percent by weight of a long-chain branched thermoplastic resin, where the long-chain branched thermoplastic resin is (i) an α-olefin polymer, (ii) a copolymer of an α-olefin and an α-ω-olefin diene, or (iii) a mixture thereof, where the long-chain branched thermoplastic resin is characterized by a weight average molecular weight from about 100,000 to about 600,000, a number average molecular weight from about 40,000 to about 200,000, a z-average molecular weight from about 400,000 to about 2,000,000, a $<g'>_{vis}$ from about 0.2 to about 0.95, and a melt flow rate from about 0.3 to about 30 dg/min.

5 Claims, No Drawings

THERMOPLASTIC ELASTOMERS HAVING IMPROVED SET AND FOAMS MADE THEREFROM

This application is a division of U.S. patent application Ser. No. 09/771,044, filed Jan. 26, 2001 and now U.S. Pat. No. 6,433,090.

TECHNICAL FIELD

This invention is directed toward thermoplastic elastomers and processes for making the same, as well as foams made from these thermoplastic elastomers. Specifically, the thermoplastic elastomers include a rubber that is at least partially cured, a long-chain branched thermoplastic resin, and optionally a linear thermoplastic resin.

BACKGROUND OF THE INVENTION

Thermoplastic elastomers are known. They have many of the properties of thermoset elastomers, yet they are processable as thermoplastics. One type of thermoplastic elastomer is a thermoplastic vulcanizate, which may be characterized by finely-divided rubber particles dispersed within a plastic. These rubber particles are crosslinked to promote elasticity. Thermoplastic vulcanizates are conventionally produced by dynamic vulcanization, which is a process whereby a rubber is cured or vulcanized within a blend with at least one non-vulcanizing polymer while the polymers are undergoing mixing or masticating at some elevated temperature, preferably above the melt temperature of the non-vulcanizing polymer.

Thermoplastic vulcanizates are useful for forming molded articles such as boots, seals, and like for use in the automotive, industrial, and consumer markets. These uses require that the articles demonstrate low set under both stress and strain. This is especially true in cold environmental conditions. Therefore, there is a continued need to lower the compression and tension set of thermoplastic vulcanizates without deleteriously impacting the mechanical properties of the thermoplastic vulcanizate.

Thermoplastic vulcanizates can also be foamed to form cellular articles such as weather seals. Typically, a foaming agent is added to the thermoplastic vulcanizate and the composition is extruded at or above the melt temperature of the thermoplastic phase. These cellular articles, however, have not always been competitive because they suffer from a relatively high compression set and high compression load deflection. As a result, their use, such as in weather seals, has been limited.

SUMMARY OF INVENTION

In general the present invention provides a thermoplastic vulcanizate prepared by a process comprising the steps of dynamically vulcanizing a vulcanizable rubber within a mixture that includes from about 15 to about 90 percent by weight of the rubber and from about 10 to about 85 percent by weight of a long-chain branched thermoplastic resin, where the long-chain branched thermoplastic resin is (i) an α-olefin polymer, (ii) a copolymer of an α-olefin and an α-ω-olefin diene, or (iii) a mixture thereof, where the long-chain branched thermoplastic resin is characterized by a weight average molecular weight from about 100,000 to about 600,000, a number average molecular weight from about 40,000 to about 200,000, and a z-average molecular weight from about 400,000 to about 2,000,000, a $<g'>_{vis}$ from about 0.2 to about 0.95, and a melt flow rate from about 0.3 to about 30 dg/min.

The present invention also includes a thermoplastic vulcanizate prepared by a process comprising the steps of dynamically vulcanizing a vulcanizable rubber within a mixture that includes the rubber and a long-chain branched thermoplastic resin, where the long-chain branched thermoplastic resin is (i) an α-olefin polymer, (ii) a copolymer of an α-olefin and an α-ω-olefin diene, or (iii) a mixture thereof, where the long-chain branched thermoplastic resin is characterized by a $<g'>_{vis}$ from about 0.2 to about 0.95, and a melt flow rate from about 0.3 to about 30 dg/min.

The present invention further includes a thermoplastic vulcanizate comprising a vulcanized rubber that has been vulcanized in the substantial absence of a peroxide curative, and a long-chain branched thermoplastic resin.

The present invention still further includes a thermoplastic vulcanizate comprising a vulcanized rubber, and from about 27 to about 40 percent by weight of a long-chain branched thermoplastic resin based upon the total weight of the vulcanized rubber and the long-chain branched thermoplastic resin.

The present invention also includes a foam profile prepared by a process comprising the steps of foaming a thermoplastic vulcanizate, where the thermoplastic vulcanizate is prepared by a process comprising the step of dynamically vulcanizing a rubber within a mixture that includes from about 15 to about 90 percent by weight of the rubber and from about 10 to about 85 percent by weight of a thermoplastic component, where the thermoplastic component includes from about 5 to about 75 percent by weight of a long-chain branched thermoplastic resin and from about 95 to about 25 percent by weight linear thermoplastic resin, where the long-chain branched thermoplastic resin is (i) an α-olefin polymer, (ii) a copolymer of an α-olefin and an α-ω-olefin diene, or (iii) a mixture thereof, where the long-chain branched thermoplastic resin is characterized by a weight average molecular weight from about 100,000 to about 600,000, a number average molecular weight from about 40,000 to about 200,000, and a z-average molecular weight from about 400,000 to about 2,000,000, a $<g'>_{vis}$ from about 0.2 to about 0.95, and a melt flow rate from about 0.3 to about 30 dg/min.

The use of long-chain branched thermoplastic resins within thermoplastic vulcanizates has surprisingly improved the tension set and compression set of the thermoplastic vulcanizates. Additionally, the use of long-chain branched thermoplastic resins provides soft thermoplastic vulcanizates having improved foaming characteristics.

PREFERRED EMBODIMENT FOR CARRYING OUT THE INVENTION

The thermoplastic vulcanizates of this invention include at least one cured rubber, at least one long-chain branched thermoplastic resin, and optionally one or more linear thermoplastic resins. These thermoplastic vulcanizates can be foamed to form cellular articles by employing a foaming agent.

Any rubber or mixture thereof that is capable of being crosslinked or cured can be used as the rubber component. Reference to a rubber may include mixtures of more than one rubber. Useful rubbers typically contain some degree of unsaturation in their polymeric main chain. Some non-limiting examples of these rubbers include elastomeric copolymers, butyl rubber, natural rubber, styrene-butadiene copolymer rubber, butadiene rubber, acrylonitrile rubber, halogenated rubber such as brominated and chlorinated isobutylene-isoprene copolymer rubber, butadiene-styrenevinyl pyridine rubber, urethane rubber, polyisoprene rubber, epichlolorohydrin terpolymer rubber, and polychloroprene. The preferred rubbers are elastomeric copolymers and butyl rubber.

The term elastomeric copolymer refers to rubbery copolymers polymerized from ethylene, at least one α-olefin monomer, and optionally at least one diene monomer. The α-olefins may include, but are not limited to, propylene, 1-butene, 1-hexene, 4-methyl-1 pentene, 1-octene, 1-decene, or combinations thereof. The preferred α-olefins are propylene, 1-hexene, 1-octene or combinations thereof. The diene monomers may include, but are not limited to, 5-ethylidene-2-norbornene; 1,4-hexadiene; 5-methylene-2-norbornene; 1,6-octadiene; 5-methyl-1,4-hexadiene; 3,7-dimethyl-1,6-octadiene; 1,3-cyclopentadiene; 1,4-cyclohexadiene; dicyclopentadiene; 5-vinyl-2-norbornene and the like, or a combination thereof. The preferred diene monomers are 5-ethylidene-2-norbornene and 5-vinyl-2-norbornene. In the event that the copolymer is prepared from ethylene, α-olefin, and diene monomers, the copolymer may be referred to as a terpolymer or even a tetrapolymer in the event that multiple α-olefins or dienes are used.

Elastomeric copolymers are commercially available under the tradenames Vistalon™ (Exxon Mobil Chemical Co.; Houston, Tex.), Keltan™ (DSM Copolymers; Baton Rouge, La.), Nordel™ IP (DuPont Dow Elastomers; Wilmington, Del.), ElastoFlo™ (Union Carbide; Danbury, Conn.), and Buna™ (Bayer Corp.; Germany).

In one embodiment, the elastomeric copolymer is a terpolymer of ethylene, at least one α-olefin monomer, and 5-vinyl-2-norbornene. This terpolymer is advantageous when a peroxide curative is employed as described in U.S. Pat. No. 5,656,693, which is incorporated herein by reference. This terpolymer is also advantageous when a silicon-containing curative is employed in the presence of platinum-containing catalyst as described in International Publication No. WO 98/38226, which is incorporated by reference. The terpolymer preferably includes from about 40 to about 90 mole percent of its polymeric units deriving from ethylene, and from about 0.2 to about 5 mole percent of its polymeric units deriving from vinyl norbornene, based on the total moles of the terpolymer, with the balance comprising units deriving from α-olefin monomer.

The term butyl rubber refers to rubbery amorphous copolymers of isobutylene and isoprene or an amorphous terpolymer of isobutylene, isoprene, and a divinyl aromatic monomer. These copolymers and terpolymers should preferably contain from about 0.5 to about 10 percent by weight, or more preferably from about 1 to about 4 percent by weight, isoprene. The term butyl rubber also includes copolymers and terpolymers that are halogenated with from about 0.1 to about 10 weight percent, or preferably from about 0.5 to about 3.0 weight percent, chlorine or bromine. This chlorinated copolymer is commonly called chlorinated butyl rubber. While butyl rubber is satisfactory for the practice. of this invention, halogen-free butyl rubber containing from about 0.6 to about 3.0 percent unsaturation is preferred, with butyl rubber having a polydispersity of about 2.5 or below being especially preferred. Butyl rubbers are commercially prepared by polymerization at low temperature in the presence of a Friedel-Crafts catalyst as disclosed within U.S. Pat. Nos. 2,356,128 and 2,944,576. Butyl rubber is commercially available from a number of sources as disclosed in the Rubber World Blue Book. For example, butyl rubber is available under the tradename Polysar Butyl™ (Bayer; Germany) or the tradename Exxon Butyl™ (Exxon Chemical Co.).

Long-chain branched thermoplastic resins, which may be referred to herein as LCB-plastics, can generally be described as high molecular weight, highly branched polymers. Reference to a LCB-plastic will include a LCB-plastic or a mixture of two or more LCB-plastics.

The LCB-plastics are (i) α-olefin polymers or (ii) copolymers of α-olefins and α-ω-dienes. The α-olefin polymers may include combinations of α-olefin units such as units deriving from propylene and ethylene. Likewise, combinations of α-ω-dienes may be used. The copolymers of α-olefins and α-ω-diene copolymers may be referred to as diene-modified polyolefin polymers.

The diene-modified polyolefin polymers contain a limited amount of α-ω-diene units so that these units are dispersed throughout the backbone of the polymer. Accordingly, the diene-modified polymers contain from 0.005 to 2.00 mole percent polymeric units deriving from dienes, preferably from 0.01 to about 1.0 mole percent polymeric units deriving from dienes, and more preferably from about 0.02 to about 0.1 mole percent polymeric units deriving from dienes. The remainder of the polymer will typically derive from α-olefins.

The LCB-plastics have a weight average molecular weight ($M_w$) from about 100,000 to about 600,000, a number average molecular weight ($M_n$) from about 40,000 to about 200,000, and a z-average molecular weight ($M_z$) from about 400,000 to about 2,000,000. More preferably, LCB-plastics have an $M_w$ from about 200,000 to about 500,000, an $M_n$ from about 50,000 to about 150,000, and an $M_z$ from about 500,000 to about 1,500,000. Even more preferably, LCB-plastics have $M_w$ from about 220,000 to about 450,000, an $M_n$ from about 60,000 to about 120,000, and a $M_z$ from about 600,000 to about 1,300,000. The molecular weights provided within this specification refer to $M_w$, $M_n$, and $M_z$ as determined by Gel Permeation Chromatography (GPC) with both polystyrene and low molecular weight polyethylene standards.

The LCB-plastics are highly branched polymeric molecules. Preferably, these polymeric molecules are characterized by having a viscosity average branching index, $<g'>_{vis}$, of from about 0.2 to about 0.95, more preferably from about 0.3 to about 0.9, and even more preferably from about 0.5 to about 0.85. The viscosity average branching index, $<g'>_{vis}$, which is determined by using GPC-3D analysis (GPC-3D (Triple Detector): Differential Refractive Index, Light Scattering, Viscometry), is one measurement of the average branching index ($<g'>$) of a molecular weight distribution of polymers.

Those skilled in the art appreciate that the branching index, g', at a given molecular weight is determined according to the formula $g' = [\eta]_{branched}/[\eta]_{linear}$, where $[\eta]_{branched}$ is the viscosity of a branched polymer at a given molecular weight slice, i, and $[\eta]_{linear}$ is the viscosity of a known linear reference polymer at the given molecular weight slice, i. And, the average branching index, $<g'>$, of the entire polymer can be determined according to the formula $<g'> = [\eta]_{branched}/[\eta]_{linear}$, where $[\eta]_{branched}$ is the viscosity of the branched polymer, and $[\eta]_{linear}$ is the viscosity of a known linear reference polymer, where the branched and linear polymers have the same molecular weight.

The viscosity average branching index ($<g'>_{vis}$) of the entire polymer may be obtained from the following equation:

$$\langle g' \rangle_{vis} = \frac{\sum C_i \cdot [\eta]_i}{\sum C_i \cdot [KM_i^\alpha]}$$

where $M_i$ is the molecular weight of the polymer, $[\eta]_i$ is the intrinsic viscosity of the branched polymer at molecular weight $M_i$, $C_i$ is the concentration of the polymer at molecular weight $M_i$, and K and $\alpha$ are measured constants from a linear polymer as described by Paul J. Flory at page 310 of Principles of Polymer Chemistry (1953), and the summation is over all the slices in the distribution. The $<g'>_{vis}$ values are obtained while the polymer is in dilute solution within 1,2,4 trichlorobenzene, and the GPC-3D is calibrated with both polystyrene and low molecular weight polyethylene standards, the light scattering detector with a series of polymers of known molecular weight, and the differential viscometer with a series of polymers of known intrinsic viscosities.

The LCB-plastics may range from amorphous polymers to highly crystalline polymers, including semi-crystalline polymers. The melt temperature of the LCB-plastics should generally be lower than the decomposition temperature of the rubber. Preferably, the melt temperature $(T_m)$ is from about 140 to about 170° C., more preferably from about 145 to about 168° C., and even more preferably from about 150 to about 165° C. The glass transition temperature $(T_g)$ is preferably from about −10 to about 10° C., more preferably from about −5 to about 5° C., and even more preferably from about −2 to about 2° C. The crystallization temperature $(T_c)$ should preferably be from about 90 to about 140° C., more preferably from about 100 to about 135° C., and even more preferably from about 105 to about 130° C.

The LCB-plastics generally have a melt flow rate that is below about 100 dg/min. Preferably, the melt flow rate should be from about 0.3 to about 30 dg/min, more preferably from about 0.4 to about 20 dg/min, and still more preferably from about 0.7 to about 5 dg/min, as determined according to ASTM D-1238, condition L (2.16 kg, 230° C.).

LCB-plastics can be synthesized by a number of techniques including the use of metallocene or Ziegler-type catalysis to form diene-modified polyolefin polymers, or by treating conventional polymers with radiation or other appropriate treatment, e.g., peroxide treatment.

For example, LCB plastics can be prepared by polymerizing one or more α-olefin monomers having at least 3 carbon atoms with at least one α-ω-diene by using a metallocene catalyst. This synthetic method is disclosed in U.S. Pat. No. 5,670,595, which is incorporated herein by reference.

Useful α-olefins include those having from 2 to 8 carbon atoms, more preferably 3, 4, 5, or 6 carbon atoms, and most preferably 3 carbon atoms. Exemplary α-olefins include ethylene, propylene, 1-butene, 1-hexene, 1-octene, 2-methyl-1-propene, 3-methyl-1-pentene, 4-methyl-1-pentene, 5-methyl-1-hexene, and mixtures thereof.

The α-ω-dienes may be linear, cyclic, or multi-cyclic, and include conjugated linear dienes and fused and non-fused cyclic dienes. The dienes are preferably α-ω-dienes such as, but not limited to, 1,7-octadiene, 1,9-decadiene, 1,13-tetradecadiene, 1,8-nonadiene, 1,10-undecadiene, 1,11-dodecadiene, 1,15-hexadecadiene, 1,17-octadecadiene, and norbornadiene. More preferably, the dienes are selected from 1,7-octadiene, 1,9-decadiene, 1,13-tetradecadiene, and norbornadiene. Most preferably, the dienes are selected from 1,9-decadiene and 1,7-octadiene.

Any metallocene catalyst may be used to synthesize the diene-modified copolymers. Metallocenes are generally represented by the formula $Cp_mMR_nX_q$, where Cp is a cyclopentadienyl ring or derivative thereof, M is a group 4, 5, or 6 transition metal, R is a hydrocarbyl group or hydrocarboxy group having from 1 to 20 carbon atoms, X is a halogen or an alkyl group, and m is an integer from about 1 to about 3, n is an integer from 0 to 3, q is an integer from 0 to 3, and the sum of m, n, and q is equal to the oxidation state of the transition metal. The metallocene may be bridged or unbridged, and include hetero atoms in the structure. Examples of particularly preferred metallocenes are discussed in U.S. Pat. Nos. 4,530,914; 4,871,705; 4,937,299; 5,124,418; 5,107,714; 5,120,867; 5,278,119; 5,304,614; 5,324,800; 5,347,025; 5,350,723; 5,391,790; and 5,391,789; EP. Pub. Nos. 591 756; 520 732; and 420 436; and WO Pub. Nos. 91/40257; 93/08221; 93/08199; and 94/01471. Each of these references are incorporated herein by reference. Particularly preferred metallocene components are those that are stereorigid and comprise a group 4, 5, or 6 transition metal. Examples include bis-cyclopentadienyl derivatives, such as bis-indenyl metallocene.

The diene-modified copolymers prepared with the foregoing metallocene catalyst may be treated with radiation, such as E-beam irradiation, to cause chain extension. This radiation treatment will increase the molecular weight of the polymers and broaden their molecular weight distribution.

Alternatively, LCB-plastic may be prepared by treating linear crystalline polyolefins with ionizing radiation. This method is disclosed in U.S. Pat. No. 4,916,198, which is incorporated herein by reference.

Still further, LCB-plastic may be prepared bypolymerizing α-olefins with an insoluble coordination catalyst system. This method is disclosed in U.S. Pat. No. 5,504,171, this is incorporated herein by reference.

In the broadest sense, the linear thermoplastic resins include those thermoplastic resins that are not LCB-plastics. More specifically, linear thermoplastic resin is a solid, generally high molecular weight plastic material. Preferably, this resin is a semi-crystalline polymer resin, and more preferably a resin that has a crystallinity of at least 25 percent as measured by differential scanning calorimetry. The melt temperature of these resins should generally be lower than the decomposition temperature of the rubber. Reference to a thermoplastic resin will include a thermoplastic resin or a mixture of two or more thermoplastic resins.

Linear thermoplastic resins preferably have a weight average molecular weight from about 200,000 to about 600,000, and a number average molecular weight from about 80,000 to about 200,000. More preferably, these resins have a weight average molecular weight from about 300,000 to about 500,000, and a number average molecular weight from about 90,000 to about 150,000.

The linear thermoplastic resins preferably have a melt temperature $(T_m)$ that is from about 150 to about 175° C., preferably from about 155 to about 170° C., and even more preferably from about 160 to about 170° C. The glass transition temperature $(T_g)$ of these resins is from about −5 to about 10° C., preferably from about −3 to about 5° C., and even more preferably from about 0 to about 2° C. The crystallization temperature $(T_c)$ of these resins is from about 95 to about 130° C., preferably from about 100 to about 120° C., and even more preferably from about 105 to about 110° C. as measured by DSC at 10° C./min.

Preferably, the linear thermoplastic resins have a melt flow rate that is less than about 10 dg/min, preferably less than about 2 dg/min, and still more preferably less than about 1.0 dg/min.

Exemplary linear thermoplastic resins include crystallizable polyolefins, polyimides, polyesters (nylons), and fluorine-containing thermoplastics. Also, the linear thermoplastic resins may include copolymers of polyolefins with styrene such as styrene-ethylene copolymer. The preferred thermoplastic resins are crystallizable polyolefins that are formed by polymerizing α-olefins such as ethylene, propylene, 1-butene, 1-hexene, 1-octene, 2-methyl-1-propene, 3-methyl-1-pentene, 4-methyl-1-pentene, 5-methyl-1-hexene, and mixtures thereof. Copolymers of ethylene and propylene or ethylene or propylene with another α-olefin such as 1-butene, 1-hexene, 1-octene, 2-methyl-1-propene, 3-methyl-1-pentene, 4-methyl-1-pentene, 5-methyl-1-hexene or mixtures thereof is also contemplated. These homopolymers and copolymers may be synthesized by using any polymerization technique known in the art such as, but not limited to, the "Phillips catalyzed reactions," conventional Ziegler-Natta type polymerizations, and metallocene catalysis including, but not limited to, metallocene-alumoxane and metallocene-ionic activator catalysis.

An especially preferred linear thermoplastic resin is a high-crystallinity isostatic or syndiotactic polypropylene. This polypropylene generally has a density of from about 0.85 to about 0.91 g/cc, with the largely isotactic polypropylene having a density of from about 0.90 to about 0.91 g/cc. Also, high and ultra-high molecular weight polypropylene that has a fractional melt flow rate is highly preferred. These polypropylene resins are characterized by a melt flow rate that is less than or equal to 10 dg/min and more preferably less than or equal to 1.0 dg/min per ASTM D-1238.

Any curative that is capable of curing or crosslinking the rubber may be used. Some non-limiting examples of these curatives include phenolic resins, peroxides, maleimides, and silicon-containing curatives. Depending on the rubber employed, certain curative may be preferred. For example, where elastomeric copolymers containing units deriving from vinyl norbornene are employed, a peroxide curative maybe preferred because the required quantity of peroxide will not have a deleterious impact on the engineering properties of the thermoplastic phase of the thermoplastic vulcanizate. In other situations, however, it may be preferred not to employ peroxide curatives because they may, at certain levels, degrade the thermoplastic components of the thermoplastic vulcanizate. Accordingly, some thermoplastic vulcanizates of this invention are cured in the absence of peroxide, or at least in the absence of an amount of peroxide that will have a deleterious impact on the engineering properties of the thermoplastic vulcanizate, which amount will be referred to as a substantial absence of peroxide. In these situations, phenolic resins or silicon-containing curative are preferred.

Any phenolic resin that is capable of crosslinking a rubber polymer can be employed in practicing the present invention. U.S. Pat. Nos. 2,972,600 and 3,287,440 are incorporated herein in this regard. The preferred phenolic resin curatives can be referred to as resole resins and are made by condensation of alkyl substituted phenols or unsubstituted phenols with aldehydes, preferably formaldehydes, in an alkaline medium or by condensation of bi-functional phenoldialcohols. The alkyl substituents of the alkyl substituted phenols typically contain 1 to about 10 carbon atoms. Dimethylol phenols or phenolic resins, substituted in para-positions with alkyl groups containing 1 to about 10 carbon atoms are preferred. These phenolic curatives are typically thermosetting resins and may be referred to as phenolic resin curatives or phenolic resins. These phenolic resins are ideally used in conjunction with a catalyst system. For example, non-halogenated phenol curing resins are preferably used in conjunction with halogen donors and, optionally, a hydrogen halide scavenger. Where the phenolic curing resin is halogenated, a halogen donor is not required but the use of a hydrogen halide scavenger, such as ZnO, is preferred. For a further discussion of phenolic resin curing of thermoplastic vulcanizates, reference can be made to U.S. Pat. No. 4,311,628, which is incorporated herein by reference.

An example of a preferred phenolic resin curative is defined according to the general formula (I).

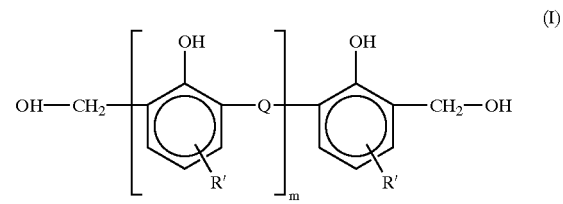

where Q is a divalent radical selected from the group consisting of —CH$_2$—, —CH$_2$—O—CH$_2$—; m is zero or a positive integer from 1 to 20 and R' is an organic radical. Preferably, Q is the divalent radical —CH$_2$—O—CH$_2$—, m is zero or a positive integer from 1 to 10, and R' is an organic radical having less than 20 carbon atoms. Still more preferably m is zero or a positive integer from 1 to 5 and R' is an organic radical having between 4 and 12 carbon atoms.

Useful silicon-containing curatives generally include silicon hydride compounds having at least two SiH groups. These compounds react with carbon-carbon double bonds of unsaturated polymers in the presence of a hydrosilation catalyst. Silicon hydride compounds that are useful in practicing the present invention include, but are not limited to, methylhydrogen polysiloxanes, methylhydrogen dimethylsiloxane copolymers, alkyl methyl polysiloxanes, bis(dimethylsilyl)alkanes, bis(dimethylsilyl benzene, and mixtures thereof.

Preferred silicon hydride compounds may be defined by the formula

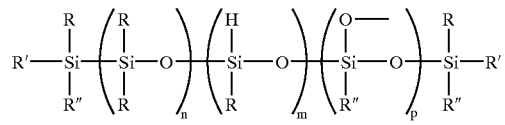

where each R is independently selected from alkyls containing 1 to 20 carbon atoms, cycloalkyls containing 4 to 12 carbon atoms, and aryls, m is an integer having a value ranging from 1 to about 50, n is an integer having a value ranging from 1 to about 50, and p is an integer having a value ranging from 0 to about 6.

As noted above, hydrosilation curing of the elastomeric polymer is preferably conducted in the presence of a catalyst. These catalysts can include, but are not limited to, peroxide catalysts and catalysts including transition metals of Group VIII. These metals include, but are not limited to, palladium, rhodium, and platinum, as well as complexes of these metals. Platinum catalyst are preferred. For a further discussion of the use of hydrosilation to cure thermoplastic vulcanizates, reference can be made to U.S. Pat. No. 5,936,028, which is incorporated herein by reference. When silicon-containing curatives are employed, the elastomeric copolymer employed will preferably include 5-vinyl-2-norbornene as the diene component.

When used, peroxide curatives are generally selected from organic peroxides. Examples of organic peroxides include, but are not limited to, di-tert-butyl peroxide, dicumyl peroxide, t-butylcumyl peroxide, α,α-bis(tert-butylperoxy)diisopropyl benzene, 2,5 dimethyl 2,5-di(t-butylperoxy)hexane, 1,1-di(t-butylperoxy)-3,3,5-trimethyl cyclohexane, -butyl-4,4-bis(tert-butylperoxy)valerate, benzoyl peroxide, lauroyl peroxide, dilauroyl peroxide, 2,5-dimethyl-2,5-di(tert-butylperoxy)hexene-3, and mixtures thereof. Also, diaryl peroxides, ketone peroxides, peroxydicarbonates, peroxyesters, dialkyl peroxides, hydroperoxides, peroxyketals and mixtures thereof may be used. For a further discussion of peroxide curatives and their use for preparing thermoplastic vulcanizates, reference can be made to U.S. Pat. No. 5,656,693, which is incorporated herein by reference.

Plasticizers, extender oils, synthetic processing oils, or a combination thereof may be employed in the compositions of the present invention. The extender oils may include, but are not limited to, aromatic, naphthenic, and paraffinic extender oils. The preferred synthetic processing oils are polylinear α-olefins. The compositions of this invention may include organic esters, alkyl ethers, or combinations thereof. U.S. Pat. Nos. 5,290,886 and 5,397,832 are incorporated herein in this regard. The addition of certain low to medium molecular weight organic esters and alkyl ether esters to the compositions of the invention dramatically lowers the $T_g$ of the polyolefin and rubber components, and of the overall composition, and improves the low temperature properties, particularly flexibility and strength. These organic esters and alkyl ether esters generally have a molecular weight that is generally less than about 10,000. It is believed that the improved effects are achieved by the partitioning of the low $T_g$ ester into both the polyolefin and rubber components of the compositions. Particularly suitable esters include monomeric and oligomeric materials having an average molecular weight below about 2000, and preferably below about 600. The ester should be compatible, or miscible, with both the polyolefin and rubber components of the composition; i.e., that it mixes with the other components to form a single phase. The esters found to be most suitable were either aliphatic mono- or diesters or alternatively oligomeric aliphatic esters or alkyl ether esters. Polymeric aliphatic esters and aromatic esters were found to be significantly less effective, and phosphate esters were for the most part ineffective.

In addition to the thermoplastic resins, rubber, curatives and optional extender oils, the compositions of the invention may also include reinforcing and non-reinforcing fillers, antioxidants, stabilizers, rubber processing oil, lubricants, antiblocking agents, anti-static agents, waxes, foaming agents, pigments, flame retardants and other processing aids known in the rubber compounding art. These additives can comprise up to about 50 weight percent of the total composition. Fillers and extenders that can be utilized include conventional inorganics such as calcium carbonate, clays, silica, talc, titanium dioxide, carbon black and the like.

Preferably, compositions of this invention will contain a sufficient amount of the rubber to form rubbery compositions of matter. The skilled artisan will understand that rubbery compositions of matter are those that have ultimate elongations greater than 100 percent, and that quickly retract to 150 percent or less of their original length within about 10 minutes after being stretched to 200 percent of their original length and held at 200 percent of their original length for about 10 minutes.

Accordingly, the thermoplastic vulcanizates of the present invention should comprise at least about 25 percent by weight rubber. More specifically, the thermoplastic vulcanizates include from about 15 to about 90 percent by weight, preferably from about 45 to about 85 percent by weight, and more preferably from about 60 to about 80 percent by weight rubber, based on the total weight of the rubber and thermoplastic component.

The thermoplastic component of the thermoplastic vulcanizates includes an LCB-plastic or a combination of an LCB-plastic and linear thermoplastic resin. In other words, the thermoplastic vulcanizates may exclusively include LCB-plastic as the thermoplastic component or may include a blend of an LCB-plastic and linear thermoplastic resin as the thermoplastic component. In either event, the thermoplastic vulcanizates should generally comprise from about 10 to about 85 percent by weight thermoplastic component, which includes LCB-plastic or a blend of LCB-plastic and linear thermoplastic component, based on the total weight of the rubber and thermoplastic component combined. Preferably, thermoplastic vulcanizates comprise from about 15 to about 70 percent by weight, and more preferably from about 20 to about 50 percent by weight, thermoplastic component based on the total weight of the rubber and thermoplastic component combined.

Where the thermoplastic vulcanizate includes a blend of LCB-plastic and linear thermoplastic resin, the thermoplastic resin component of the thermoplastic vulcanizate preferably contains from about 5 to about 75 percent by weight LCB-plastic and from about 95 to about 25 percent by weight linear thermoplastic resin based upon the total weight of the thermoplastic component. More preferably, the thermoplastic vulcanizate contains from about 15 to about 60 percent by weight LCB-plastic and from about 85 to about 40 percent by weight thermoplastic resin, and even more preferably from about 25 to about 50 percent by weight LCB-plastic and from about 75 to about 50 percent by weight linear thermoplastic resin based upon the total weight of the thermoplastic component. Surprisingly, thermoplastic vulcanizates that contain blends of LCB-plastic and linear thermoplastic resin provide compositions that can be foamed into cellular materials that exhibit improved properties such as compression set and compression load deflection.

Where extruded materials are desired that exhibit improved compression set and improved melt strength, a greater amount of LCB-plastic may be desirable. In these embodiments, the thermoplastic component of the thermoplastic vulcanizate preferably contains greater than 75 percent by weight LCB-plastic, more preferably greater than 90 percent by weight LCB-plastic, even more preferably greater than 95 percent by weight LCB-plastic, and still more preferably greater than 99 percent by weight LCB-plastic. In these embodiments, the thermoplastic vulcanizates preferably contain from about 27 to about 40 percent by weight LCB-plastic based on the total weight of the rubber and LCB-plastic. More preferably, these thermoplastic vulcanizates include from about 30 to about 38 percent by weight LCB-plastic, and even more preferably from about 33 to about 35 percent by weight LCB-plastic based on the total weight of the rubber and LCB-plastic combined.

The skilled artisan will be able to readily determine a sufficient or effective amount of vulcanizing agent to be employed without undue calculation or experimentation. The amount of vulcanizing agent should be sufficient to at least partially vulcanize the elastomeric polymer. Preferably, the elastomeric polymer is completely vulcanized.

Where a phenolic resin curative is employed, a vulcanizing amount of curative preferably comprises from about 1 to about 20 parts by weight, more preferably from about 3 to about 16 parts by weight, and even more preferably from about 4 to about 12 parts by weight, phenolic resin per 100 parts by weight rubber.

Where a peroxide curative is employed, a vulcanizing amount of curative preferably comprises from about $1\times10^{-4}$ moles to about $2\times10^{-2}$ moles, more preferably from about $2\times10^{-4}$ moles to about $2\times10^{-3}$ moles, and even more preferably from about $7\times10^{-4}$ moles to about $1.5\times10^{-3}$ moles per 100 parts by weight rubber.

Where silicon-containing curative is employed, a vulcanizing amount of curative preferably comprises from 0.1 to about 10 mole equivalents, and preferably from about 0.5 to about 5 mole equivalents, of SiH per carbon-carbon double bond.

Generally, from about 5 to about 300 parts by weight, preferably from about 30 to about 250 parts by weight, and more preferably from about 70 to about 200 parts by weight, of extender oil per 100 parts rubber is added. The quantity of extender oil added depends upon the properties desired, with the upper limit depending upon the compatibility of the particular oil and blend ingredients; this limit is exceeded when excessive exuding of extender oil occurs. The amount of ester plasticizer in the composition will generally be less than about 250 parts, and preferably less than about 175 parts, per 100 parts rubber.

Carbon black may be added in amount from about 40 to about 250, and more preferably from about 40 to about 100 parts by weight per 100 parts by weight of rubber and thermoplastic material combined. The amount of carbon black that can be used depends, at least in part, upon the type of carbon black and the amount of extender oil that is used. The amount of extender oil depends, at least in part, upon the type of rubber. High viscosity rubbers are more highly oil extendable.

The thermoplastic elastomers may be prepared by using blending and dynamic vulcanization techniques that are well known in the art. Preferably, the thermoplastic elastomers are prepared in a one-step process whereby the rubber, the LCB-plastic, and the optional linear thermoplastic resin are blended and the rubber is dynamically vulcanized within the blend.

The term dynamic vulcanization refers to a vulcanization or curing process for a rubber contained in a thermoplastic elastomer composition, wherein the rubber is vulcanized under conditions of high shear at a temperature above the melting point of the polyolefin component. The rubber is thus simultaneously crosslinked and dispersed as fine particles within the polyolefin matrix, although other morphologies may also exist. Dynamic vulcanization is effected by mixing the thermoplastic elastomer components at elevated temperature in conventional mixing equipment such as roll mills, Banbury mixers, Brabender mixers, continuous mixers, mixing extruders and the like.

Those ordinarily skilled in the art will appreciate the appropriate quantities, types of cure systems, and vulcanization conditions required to carry out the vulcanization of the rubber. The rubber can be vulcanized by using varying amounts of curative, varying temperatures, and a varying time of cure in order to obtain the optimum crosslinking desired.

The term vulcanized or cured rubber refers to an elastomeric polymer that has undergone at least a partial cure. The degree of cure can be measured by determining the amount of gel, or conversely, the rubber that is extractable from the thermoplastic elastomer by using boiling xylene or cyclohexane as an extractant. This method is disclosed in U.S. Pat. No. 4,311,628. By using this method as a basis, the cured rubber of this invention will have a degree of cure where not more than 35 percent of the rubber is extractable, preferably not more than 15 percent, even more preferably not more than 10 percent, and still more preferably not more than 5 percent of the rubber is extractable. Alternatively, the degree of cure may be expressed in terms of crosslink density. Preferably, the crosslink density is from about 40 to about 160 moles per milliliter of rubber. All of these descriptions are well known in the as and described in U.S. Pat Nos. 5,100,947 and 5,157,081, which are incorporated herein by reference.

Despite the fact that the rubber component is partially or fully cured, the compositions of this invention can be processed and reprocessed by conventional plastic processing techniques such as extrusion, injection molding, and compression molding. The rubber within the thermoplastic elastomers of this invention is usually in the form of finely-divided and well-dispersed particles of vulcanized or cured rubber, although a co-continuous morphology or a phase inversion is also possible.

The thermoplastic vulcanizates of this invention are useful for making a variety of molded and extruded articles such as weather seals, hoses, belts, gaskets, moldings, boots, elastic fibers and like articles. They are particularly useful for making articles by blow molding, extrusion, injection molding, thermo-forming, elasto-welding and compression molding techniques. More specifically, they are useful for making vehicle parts such as weather seals, brake parts such as cups, coupling disks, and diaphragm cups, boots such as constant velocity joints and rack and pinion joints, tubing, sealing gaskets, parts of hydraulically or pneumatically operated apparatus, o-rings, pistons, valves, valve seats, valve guides, and other elastomeric polymer based parts or elastomeric polymers combined with other materials such as metal/plastic combination materials. Also contemplated are transmission belts including V-belts, toothed belts with truncated ribs containing fabric faced V's, ground short fiber reinforced V's or molded gum with short fiber flocked V's. The thermoplastic vulcanizates of this invention are also useful for making cellular articles such as weather seals. In fact, the superior properties of the cellular articles produced according to this invention can replace rubber sponge in the most demanding weather seal applications such as trunk and primary door seals in motor vehicles.

The thermoplastic vulcanizates of this invention can be foamed by using conventional foaming procedures, which are well known in the art. In general, these procedures include (i) heating the thermoplastic vulcanizate to a temperature above the melting point of the LCB-plastic, linear plastic, or both, (ii) adding a blowing agent, and (iii) releasing the thermoplastic vulcanizate to atmospheric temperature and pressure. Depending on the type of blowing agent employed, the blowing agent may be added to the thermoplastic vulcanizate prior to heating the thermoplastic vulcanizate in the foaming process, although it is preferred to add the blowing agent to the thermoplastic vulcanizate while it is in its molten state. Also, high pressure is typically required to prevent the foaming agent from prematurely expanding prior to releasing the thermoplastic vulcanizate to atmospheric temperature and pressure. Where a chemical blowing agent is employed, the step of heating should heat the thermoplastic vulcanizate and blowing agent high enough to trigger the chemical decomposition of the blowing agent.

In one embodiment, the thermoplastic vulcanizates of this invention are foamed by using an extruder, such as a single or twin screw extruder. Upon releasing the thermoplastic vulcanizate from the extruder, the extrudate can be shaped, such as by extruding through a shaping die to form a profile. Alternatively, the thermoplastic vulcanizate can be injected into a mold to produce a foamed thermoplastic part.

In one preferred embodiment, the thermoplastic vulcanizate is foamed by using a single screw extruder that includes a two-stage shearing section that includes spaced blisters and a homogenizing section between the blisters, and a homogenizing section downstream of the blisters. By using this extruder, water can be used as a blowing agent to produce technologically useful foam profiles. This extruder and the method for its use are disclosed in U.S. Pat. No. 5,567,370, which is incorporated herein by reference.

The foaming agents may include physical blowing agents, chemical blowing agents, or both. Preferably, the blowing agents should be soluble in the thermoplastic phase of the thermoplastic vulcanizate at the operating conditions of temperature and pressure, i.e., while in the extruder, and phase separate at atmospheric pressure and ambient temperature, or at a temperature and pressure that is lower than the conditions within the extruder.

The physical blowing agents may include water, hydrocarbons such as pentane, propane and butane, fluorocarbons, hydrofluorocarbons, chlorofluorocarbons, hydrochlorofluorocarbons, nitrogen, and super critical fluids such as carbon dioxide.

The physical blowing agents should be used in an amount from about 0.1 to about 10 parts by weight, and preferably from about 0.5 to about 5 parts by weight, based on the total weight of the thermoplastic vulcanizate and the blowing agent mixture.

In one preferred embodiment of this invention, water is used as a blowing agent. In this embodiment, from about 0.1 to about 10 parts by weight water is added per 100 parts by weight of the thermoplastic vulcanizate. In conjunction with the water, detergents, surfactants, or glycols such as ethylene glycol, may be used. This preferred process for foaming the thermoplastic vulcanizatesis disclosed in U.S. Pat. No. 5,070,111, which is incorporated herein by reference.

Chemical blowing agents include both exothermic and endothermic blowing agents. Examples of these chemical blowing agents include inorganic foaming agents such as sodium hydrogen carbonate, sodium carbonate, ammonium hydrogen carbonate, ammonium carbonate and ammonium nitrite; nitrous compounds such as N,N'-dimethyl-N,N'-dinitrosoterephthalamide and N,N'-dinitrosopentamethylenetetramine; azo compounds such as azodicarbonamide, azobisisobutyronitrile, azocyclohexylnitrile, azodiaminobenzene and barium azodicarboxylate; sulfonylhydrazide compounds such as benzenesulfonylhydrazide, toluenesulfonylhydrazide, p,p'-oxybis(benzenesulfonylhydrazide) and diphenylsulfone-3,3'-disulfonylhydrazide; and azide compounds such as calcium azide, 4,4'-diphenyldisulfonylazide and p-toluenesulfonylazide. Blends of the foregoing may also be employed such as blends of citric acid and sodium bicarbonate.

The chemical blowing agents should be used in an amount from about 0.5 to about 10 parts by weight, and preferably from about 1 to about 7 parts by weight, based on the total weight of the thermoplastic vulcanizate and the blowing agent mixture combined.

If necessary, a foaming assistant such as a nucleating agent may be added. These nucleating agents are well known to those skilled in the art as disclosed in Thermoplastic Foams, by J. L. Throne, Sherwood Publishers, Hinckley, Ohio, 1996, which is incorporated herein by reference.

In order to demonstrate the practice of the present invention, the following examples have been prepared and tested as described in the General Experimentation Section disclosed hereinbelow. The examples should not, however, be viewed as limiting the scope of the invention. The claims will serve to define the invention.

GENERAL EXPERIMENTATION

Samples 1–17

Thermoplastic vulcanizates were prepared with long-chain branched thermoplastic resins and compared to thermoplastic vulcanizates prepared with linear thermoplastic resins. Table I provides the characteristics of the five different LCB-plastic resins that were employed. MFR was determined according to ASTM D-1238, condition L, under 2.16 Kg load at 30° C. by using an appropriate capillary tube. The molecular weights were determined by using GPC with the polymer dissolved in 1,2,4-trichlorobenzene at 145° C., and the instrument calibrated with both polystyrene and low molecular weight polyethylene standards. $\langle g \rangle_w$ was determined by using GPC MALLS (Multiple Angle Laser Light Scattering), and $\langle g \rangle_z$ was determined by using GPC MALLS. $\langle g \rangle_w$ may be obtained from the following equation:

$$\langle g \rangle_w = \frac{\sum C_i R_{gi}^2}{\sum C_i [KM_i^\alpha]^2}$$

where $M_i$ is the molecular weight of the polymer, $C_i$ is the concentration of the polymer at molecular weight $M_i$, $R_{gi}$ is the radius of gyration of the branched polymer at molecular weight $M_i$, and K and $\alpha$ are measured constants from a linear polymer as described by Paul J. Flory at page 310 of Principles of Polymer Chemistry (1953), and the summation is over all the slices in the distribution. Further, $\langle g \rangle_z$ of the entire polymer may be obtained from the following equation:

$$\langle g \rangle_z = \frac{\sum C_i M_i R_{gi}^2}{\sum C_i M_i [KM_i^\alpha]^2}$$

where the variables $M_i$, $C_i$, $R_{gi}$, K and $\alpha$ are as described above.

TABLE I

| | LCB-Plastic I | LCB-Plastic II | LCB-Plastic III | LCB-Plastic IV | LCB-Plastic V | LCB-Plastic VI |
|---|---|---|---|---|---|---|
| $M_n$ | 69,000 | 63,400 | 107,475 | 62,935 | 52,041 | 107,100 |
| $M_w$ | 425,300 | 391,100 | 272,682 | 237,068 | 202,906 | 604,100 |

TABLE I-continued

|  | LCB-Plastic I | LCB-Plastic II | LCB-Plastic III | LCB-Plastic IV | LCB-Plastic V | LCB-Plastic VI |
|---|---|---|---|---|---|---|
| $M_z$ | 1,301,000 | 1,188,000 | 619,647 | 571,027 | 459,749 | 1,601,000 |
| $M_w/M_n$ | 6.16 | 6.17 | 2.54 | 3.77 | 3.90 | 5.64 |
| $M_z/M_w$ | 3.06 | 3.04 | 2.27 | 2.41 | 2.27 | 2.65 |
| $<g>_w$ | — | — | 0.75 | 0.49 | 0.85 | — |
| $<g>_z$ | — | — | 0.59 | 0.65 | 0.75 | — |
| g' @ MW > 1 × 10⁶ | ≦0.55 | ≦0.50 | — | — | — | ≦0.78 |
| $T_m$ (° C.) | 160.87 | 161.80 | — | 152.2 | 152.1 | 163.9 |
| $T_c$ (° C.) | 129.42 | 129.93 | — | 107.7 | 108.9 | — |
| MFR (dg/min) | 3.0 | 5.5 | 1.4 | 4.8 | 10 | 0.3 |
| Diene (ppm) | — | — | 375 | 300 | 200 | 0 |

LCB-Plastic I was obtained under the tradename PF814™ (Montell), and LCB-Plastic II was obtained under the tradename PF633™ (Montell). LCB-Plastic II, IV, and V were generally prepared as disclosed in U.S. Pat. No. 5,570,595, which is incorporated herein by reference.

The thermoplastic vulcanizates of Samples 1–9 included 100 parts by weight terpolymer rubber obtained under the tradename Vistalon™ (Exxon Mobil), varying amounts of one of the LCB-plastics or a linear thermoplastic resin, 4.5 parts by weight phenolic resin (Schenectady International; Schenectady, N.Y.), 2 parts by weight zinc oxide, 1.26 parts by weight stannous chloride, 10 parts by weight clay (Burgess™), 130 parts by weight, processing oil (Sunpar 150™), and 3.5 parts by weight wax (Sunolite™).

The thermoplastic vulcanizates of Samples 10–13 included mixing 100 parts by weight terpolymer rubber obtained under the tradename Vistalon™ (Exxon Mobil), varying amounts of one of the LCB-plastics or a linear thermoplastic resin, 6 parts by weight phenolic resin (Schenectady International; Schenectady, N.Y.), 2 parts by weight zinc oxide, 1.26 parts by weight stannous chloride, 10 parts by weight clay (Burgess™), 107 parts by weight, processing oil (Sunpar 150™), and 3.5 parts by weight wax (Sunolite™).

The linear Resin I was obtained under the tradename DO08M™ (Aristech Chemical Corp.), and was characterized by having an MFR of about 0.8 dg/min., an $M_n$ of about 88,000, an $M_w$ of about 364,000, an $M_w/M_n$ of about 4.13, and a melt temperature of about 167° C. The linear Resin II was obtained under the tradename 51S07A™ (Equistar), and was characterized by having an MFR of about 0.7 dg/min., an $M_n$ of about 112,651, an $M_w$ of about 445,060, an $M_w/M_n$ of about 3.95, and a melt temperature of about 168° C. Linear Resin III was obtained under the tradename PP4782™ (Exxon), and was characterized by having an MFR of about 1.9 dg/min, an $M_n$ of about 108,691, an $M_w$ of about 387,924 and $M_w/M_n$ of about 3.57 and a melt temperature of about 168.

The rubber, the LCB-plastic or linear thermoplastic, and other additives were blended in a large-scale high shear mixer at a temperature of about 120° to about 190° C. as described in U.S. Pat. No. 4,594,390, which is incorporated herein by reference.

Stress at 100 percent strain, tensile strength, and elongation at break were determined according to ASTM D-412 at 23° C. by using an Instron testing machine. Weight gain was determined according to ASTM D-471 after 24 hours at 125° C. Tension set was determined according to ASTM D-142, compression set was determined at 25% compression according to ASTM D-395, and toughness was determined according to ASTM D-1292. ACR viscosity, which is a measure of the shear viscosity of a thermoplastic vulcanizate at a fixed shear stress, was measured by using an automated capillary rheometer that was equipped with a 33:1 L/D, 0.031 diameter orifice, at 204° C. and 118 kPa. Shore hardness was determined according to ASTM D-2240. Extensional viscosity was determined from melt strength measurements by using a Rhestens Instrument from Goettfert Company, Germany.

Extrusion surface roughness was measured as described in *Chemical Surface Treatments of Natural Rubber And EPDM Thermoplastic Elastomers: Effects on Friction and Adhesion*, Rubber Chemistry and Technology, Vol. 67, No. 4 (1994). Spiral flow measurements were conducted as follows. A sample of dry thermoplastic vulcanizate is loaded into the hopper of a 136 metric ton injection molding machine (Newbury H6-150ARS) having a 45 mm screw diameter, a screw length/diameter ratio of 16:1 to 20:1, a compression ratio of 2.5:1, a maximum injection pressure of 1950 psi, and an initial inject timer with the capability of adjusting to 0.01 seconds accuracy. Attached to the injection molding machine is a single cavity spiral flow mold (Master Unit Die 84/90-001) equipped with a mold temperature controller. The heat zones of the molding machine are set to achieve an actual melt temperature of about 195° C., both the initial inject and overall inject timers are set for three seconds, and the cure timer is set for 25–30 seconds. Other melt temperatures may be selected depending on the material. The injection pressure is adjusted according to the desired measurement, e.g., 450 psi, 950 psi, and 1,450 psi. Fifteen transition shots are molded into the single cavity spiral flow old and five samples are recorded for flow length and cavity pressures.

The amount of linear thermoplastic resin or LCB-plastic resin that was used in each sample is provided in Table II along with the results of the physical testing of each sample.

TABLE II

| | Samples | | | | | | | | | |
|---|---|---|---|---|---|---|---|---|---|---|
| | 1 | 2 | 3 | 4 | 5 | 6 | 7 | 8 | 9 | 10 |
| Linear Plastic I | 41 | — | — | — | — | 10 | 20 | — | — | — |
| Linear Plastic II | — | 41 | — | — | — | — | — | — | — | — |
| Linear Plastic III | — | — | — | — | — | — | — | — | — | — |

TABLE II-continued

| | | | | | | | | | | |
|---|---|---|---|---|---|---|---|---|---|---|
| LCB Plastic I | — | — | 41 | — | — | — | — | — | — | — |
| LCB Plastic II | — | — | — | 41 | — | — | — | — | — | — |
| LCB Plastic III | — | — | — | — | 41 | 31 | 21 | — | — | — |
| LCB Plastic IV | — | — | — | — | — | — | — | 41 | — | 51 |
| LCB Plastic V | — | — | — | — | — | — | — | — | 41 | — |
| Shore A Hardness | 66 | 65 | 54 | 54 | 54 | 57 | 60 | 55 | 56 | 66 |
| Shore D Hardness | — | — | — | — | — | — | — | — | — | — |
| Ultimate Tensile Strength (MPa) | 6.55 | 5.74 | 4.53 | 4.5 | 3.28 | 3.49 | 5.25 | 3.43 | 3.55 | 5.91 |
| Elongation at Break (%) | 465 | 342 | 293 | 287 | 239 | 250 | 382 | 273 | 377 | 334 |
| M 100 (MPa) | 2.37 | 2.62 | 1.87 | 1.83 | 1.82 | 1.94 | 2.03 | 1.84 | 1.88 | 2.61 |
| % Weight Gain | 101 | 90 | 116 | 118 | 131 | 121 | 121 | 119 | 115 | 65 |
| ACR Viscosity @ 204° C. (Poise) | 367 | 242 | 9,089 | 10,580 | 9,009 | 1,234 | 818 | 5,733 | 1,200 | 146 |
| Extensional Viscosity @ 190° C. (MPa) | 0.0606 | 0.111 | Fell Apart | Fell Apart | 0.12 | 0.145 | 0.097 | 0.114 | 0.0884 | — |
| ESR (Ra) | 117 | 71 | 497 | 297 | >400 | 163 | 129 | 329 | 198 | 39 |
| Spiral Flow (Ins.) Inches @ 400 F. @ 950 (MPa) | 28.1 | 27.4 | 15.3 | 15.8 | 16.6 | 18.8 | 21.8 | 18.3 | 21.8 | — |
| Tension Set @ 24° C. (%) | 10 | 12.5 | 5 | 5 | 6 | 6 | 7.5 | 6 | 6 | 10 |
| Compression Set (%) 70° C. @ 22 Hrs | 26 | 26 | 19 | 19 | 20 | 22 | 24 | 19 | 20 | — |
| Compression Set (%) 100° C. @ 22 Hrs | 27 | 28 | 22 | 22 | 22 | 24 | 25 | 20 | 23 | — |

| | Samples | | | | | | |
|---|---|---|---|---|---|---|---|
| | 11 | 12 | 13 | 14 | 15 | 16 | 17 |
| Linear Plastic I | — | — | — | — | — | — | — |
| Linear Plastic II | 50 | — | — | — | 229 | — | — |
| Linear Plastic III | — | 50 | — | — | — | — | — |
| LCB Plastic I | — | — | 50 | — | — | 229 | — |
| LCB Plastic II | — | — | — | 50 | — | — | 229 |
| LCB Plasflc III | — | — | — | — | — | — | — |
| LCB Plastic IV | — | — | — | — | — | — | — |
| LCB Plastic V | — | — | — | — | — | — | — |
| Shore A Hardness | 67 | 70 | 59 | 59 | — | — | — |
| Shore D Hardness | — | — | — | — | 43 | 42 | 41 |
| Ultimate Tensile Strength (MPa) | 5.87 | 6.33 | 4.12 | 3.76 | 16.22 | 16.00 | 18.06 |
| Elongation at Break (%) | 243 | 258 | 208 | 208 | 434 | 339 | 384 |
| M 100 (MPa) | 3.11 | 2.83 | 2.56 | 2.45 | 9.94 | 10.72 | 11.49 |
| % Weight Gain | 104 | 114.5 | 100.5 | 106.5 | 62 | 85 | 87 |
| ACR Viscosity @ 204° C. (Poise) | 985 | 485 | 2,747 | 2,159 | 2,535 | 583 | 545 |
| Extensional Viscosity @ 190° C. (MPa) | 0.189 | 0.141 | 0.0825 | — | — | — | — |
| ESR (Ra) | 520 | 486 | 273 | 285 | — | — | — |
| Spiral Flow (Ins.) Inches @ 40° F. @ 950 (MPa) | 21 | 25 | 18 | 19 | — | — | — |
| Tension Set @ 24° C. (%) | 12.5 | 11.5 | 5 | 6 | 32 | 26 | 27 |
| Compression Set (%) 70° C. @ 22 Hrs | 43 | 47 | 30 | 28 | — | — | — |
| Compression Set (%) 100° C. @ 22 Hrs | — | — | — | — | — | — | — |

Samples 18–23

In a similar fashion to Samples 1–13, additional thermoplastic vulcanizates were prepared with linear thermoplastic resins or blends of linear thermoplastic resins and LCB-plastic resins. LCB-Plastic VI, the characteristics of which are described above, was obtained under the tradename Profax™ SD613 (Montell). This material was further characterized by a shear viscosity at 1 s$^{-1}$ and 180° C. of 20 kPa·s, and an extensional viscosity at 0.1 s$^{-1}$ strain rate and 180° C. of 2×10$^5$ Pa·s at 10 seconds and 6×10$^5$ Pa·s at 35 seconds. LCB-Plastic VII was obtained under the tradename HMS 130D™ (Borealis). This polymer was characterized by a shear viscosity at 1 s$^{-1}$ and 180° C. of 4.5 kPa·s, and an extensional viscosity at 0.1 s$^{-1}$ strain rate and 180° C. of 4×10$^4$ Pa·s at 10 seconds and 1×10$^6$ Pass at 35 seconds.

The thermoplastic vulcanizates of Samples 18–23 included mixing 100 parts by weight terpolymer rubber obtained under the tradename Vistalon™ (Exxon Mobil), varying amounts of linear thermoplastic resin or blends of linear thermoplastic resin and LCB-plastic resin, 4 parts by weight phenolic resin (Schenectady International), 2 parts by weight zinc oxide, 1.5 parts by weight stannous chloride, 10 parts by weight clay (Icecap™), and 150 parts by weight processing oil (Sunpar 150™). The linear thermoplastic resin employed was obtained under the tradename D008M (Aristech), and was characterized by having an MFR of about 0.8 dg/min., an $M_n$ of about 88,000, an $M_w$ of about 364,000, an $M_w/M_n$ of about 4.13, and a melt temperature of about 161° C.

The amount of linear thermoplastic resin and LCB-plastic resin used in each sample is provided in Table III along with the results of physical testing of each sample.

TABLE III

| Samples | 18 | 19 | 20 | 21 | 22 | 23 |
|---|---|---|---|---|---|---|
| Linear-Thermoplastic Resin | 42 | 32 | 16 | 24 | 16 | 24 |
| LCB-Plastic Resin VI | — | — | 16 | 8 | — | — |
| LCB-Plastic Resin VII | — | — | — | — | 16 | 8 |
| Shore A Hardness | 66 | 60 | 57 | 60 | 60 | 60 |
| ACR Viscosity (Poise) | 353 | 310 | 382 | 443 | 413 | 461 |
| Ultimate Tensile Strength (MPa) | 6.9 | 5.6 | 6.14 | 5.7 | 4.57 | 5.18 |

TABLE III-continued

| Samples | 18 | 19 | 20 | 21 | 22 | 23 |
|---|---|---|---|---|---|---|
| Modulus at 100% (MPa) | 2.71 | 2.63 | 2.54 | 2.65 | 1.83 | 1.79 |
| Elongation at Break (%) | 520 | 368 | 397 | 365 | 332 | 380 |
| % Weight Gain 24 hrs at 125° C. | 116.7 | 82.5 | 89.5 | 87 | 73.5 | 87 |
| Extensional Viscosity (kPa · s) | 152 | 222 | 152 | 193 | 132 | 204 |
| ESR (Ra) | 66 | 60 | 72 | 61 | 61 | 77 |
| Tension Set @ 24° C. | — | 7.5 | 5 | 8.5 | 8.5 | 6 |

The thermoplastic vulcanizates prepared in Samples 18–23 were foamed into profiles. This was accomplished by using a six-zone, 60 mm diameter, single-screw extruder having a 30:1 L/D. The thermoplastic vulcanizate was fed at a rate of about 15–40 kg per hour in conjunction with from about 90 to about 500 ml of foaming agent per hour, where the foaming agent was injected between zones 4 and 5. At the exit end of the extruder, the extrudate was released through a bulb profile die with a wall thickness of 1 mm. A pressure of at least 2.5 MPa was experienced at the die head, and the foaming agent (water) was injected at about 14–20 MPa. When used, the chemical foaming agent was obtained under the tradename Hydrocerol™ (Clariant; Charlotte, N.C.) Each temperature zone was set to a temperature between about 160° C. and about 200° C.

The extruded cellular profiles were subjected to physical testing. Specific gravity was determined according to Archimede's method, extrusion surface roughness (Ra) was determined as described above, water absorption was determined according to ASTM D1056, compression set was determined by using a test method similar to ASTM D395-89 after 22 hours at 100° C., and compression load deflection was determined as follows. A 100 mm sample is uniformly compressed to 40% of its height at room temperature for three times and the third force measurement is reported as the compression load deflection. The results of this physical testing are provided in Table IV.

TABLE IV

| Samples | 18 | 19 | 20 | 21 | 22 | 23 |
|---|---|---|---|---|---|---|
| Foam Specific Gravity (1.1 wt % H$_2$O) | — | 0.48 | 0.56 | 0.48 | 0.57 | 0.51 |
| Foam Specific Gravity (1.4 wt % H$_2$O) | 0.45 | 0.4 | 0.51 | 0.45 | 0.46 | 0.43 |
| ESR (Ra) in μm | 9.1 | 8.5 | 9.3 | 8.8 | 9.3 | 8.6 |
| Water Absorption Atmospheric (wt %) | — | 6.1 | 3.8 | 5.4 | 4.4 | 6.0 |
| Water Absorption Vacuum (wt %) | — | 31.4 | 18.9 | 31.7 | 26.8 | 40.3 |
| Compression Set 22 hrs @ 100° C. (%) & 40% compression | 52 | 38.6 | 34 | 32.8 | 35 | 35.5 |
| Compression Load Deflection (Kgf/100 mm) | 0.77 | 0.44 | 0.75 | 0.36 | 0.42 | 0.36 |

While the best mode and preferred embodiment of the invention have been set forth in accord with the Patent Statues, the scope of this invention is not limited thereto, but rather is defined by the attached claims. Thus, the scope of the invention includes all modifications and variations that may fall within the scope of the claims.

What is claimed is:

1. A thermoplastic vulcanizate comprising a vulcanized rubber within a mixture that includes from about 15 to about 90 percent by weight of the rubber and from about 10 to about 85 percent by weight of a long-chain branched thermoplastic resin, where said long-chain branched thermoplastic resin is (i) an α-olefin polymer, (ii) a copolymer of an α-olefin and an α-ω-olefin diene, or (iii) a mixture thereof, where the long-chain branched thermoplastic resin is characterized by a $<g'>_{vis}$ from about 0.2 to about 0.95, and a melt flow rate from about 0.3 to about 30 dg/min.

2. The thermoplastic vulcanizate of claim 1 containing from about 27 to about 40 percent by weight of said long-chain branched thermoplastic resin based upon the total weight of the vulcanized rubber and the long-chain branched thermoplastic resin.

3. The thermoplastic vulcanizate of claim 2, where the vulcanized rubber has a crosslink density from about 40 to about 180 moles per milliliter of rubber.

4. The thermoplastic vulcanizate of claim 2, where the vulcanized rubber has a degree of cure where not more than 15 percent of the rubber is extractable in boiling xylene or cyclohexane.

5. The thermoplastic vulcanizate of claim 1, where the long-chain branched thermoplastic resin has a weight average molecular weight from about 100,000 to about 600,000, a number average molecular weight from about 40,000 to about 200,000, and a z-average molecular weight from about 400,000 to about 2,000,000.

* * * * *